United States Patent
Dolcetta et al.

(10) Patent No.: US 7,657,184 B2
(45) Date of Patent: Feb. 2, 2010

(54) INTERACTIVE VEHICULAR COMMUNICATION SYSTEM, PARTICULAR BETWEEN CARS AND ITS METHOD OF USE

(75) Inventors: Alessandro Dolcetta, Vicenza (IT); Alberto Filosofo, Vicenza (IT)

(73) Assignee: Astron Fiamm Safety S.p.A., Montecchio Maggiore (IT)

( * ) Notice: Subject to any disclaimer, the term of this patent is extended or adjusted under 35 U.S.C. 154(b) by 574 days.

(21) Appl. No.: 11/573,204

(22) PCT Filed: Aug. 5, 2005

(86) PCT No.: PCT/IB2005/002344

§ 371 (c)(1), (2), (4) Date: Mar. 7, 2007

(87) PCT Pub. No.: WO2006/024906

PCT Pub. Date: Mar. 9, 2006

(65) Prior Publication Data

US 2008/0069568 A1    Mar. 20, 2008

(30) Foreign Application Priority Data

Aug. 5, 2004    (IT)    ............................ VI2004A0199

(51) Int. Cl.
H04B 10/00    (2006.01)
(52) U.S. Cl. .......................... 398/128; 398/118; 398/130
(58) Field of Classification Search .................. 398/118, 398/128–131
See application file for complete search history.

(56) References Cited

U.S. PATENT DOCUMENTS

| 3,112,004 | A | | 11/1963 | Neaville |
| 4,921,468 | A | * | 5/1990 | Miwa .......................... 398/106 |
| 5,835,203 | A | * | 11/1998 | Ogura et al. ................ 356/5.01 |
| 2004/0067787 | A1 | * | 4/2004 | Terashima et al. ........ 455/575.9 |

FOREIGN PATENT DOCUMENTS

| FR | 2628586 | 9/1989 |
| GB | 2326298 | 12/1998 |

* cited by examiner

Primary Examiner—Nathan M Curs
(74) Attorney, Agent, or Firm—Themis Law

(57) ABSTRACT

An interactive vehicle communication system, particularly for communication between motor vehicles, comprises a communication device (2) which may be placed on a stationary support (3) or a vehicle (4) traveling on a roadway and a receiver device (5), which may be placed on a stationary support (3) or a vehicle (4') traveling on a roadway and interacts with said communication device (2). The communication device (2) comprises first means (6) for interfacing with external data detection and/or generation means, emitter means (9) for generating and emitting a visible light-emitting laser beam (8) with predetermined solid angle (a) and range, digitizing means (7) for digitizing said laser beam (8) and control means (10) for appropriately conforming and orienting said laser beam (8), to allow it to selectively interact with vehicle driving in a predetermined drive direction, excluding the other vehicles driving in the opposite drive direction. The receiver device (5) comprises: receiving means (11) for receiving said laser beam (8) and second means for interfacing (12) with external transducer means.

9 Claims, 3 Drawing Sheets

INTERACTIVE VEHICULAR COMMUNICATION SYSTEM, PARTICULAR BETWEEN CARS AND ITS METHOD OF USE

FIELD OF THE INVENTION

This invention finds application in the field of transportation, and particularly relates to an interactive vehicle communication system, particularly for communication between motor vehicles.

The invention further relates to a method of use of such vehicle communication system.

BACKGROUND ART

Information regarding roadways is usually distributed by direct provision of information to the user, who mainly perceives it visually. For example, more or less visible signs can communicate prohibitions, danger situations or general information.

These signs are often poorly visible, especially in bad weather conditions, and may be a cause of distraction for the user.

Inter-vehicle communication, e.g. over a roadway, is also mainly based on visual signals.

For instance, a user will turn on the appropriate lights for signal positioning and use the special turn indicator lights for direction change.

These systems have the same drawbacks as mentioned above.

However, wireless laser- or radio-based communication systems are currently commercially available.

From US application 2004067787, an antenna is known having a laser emitter, which projects a beam in a predetermined point, the beam being adapted to be captured and decoded by a device that is mounted on driving vehicles.

A drawback of this solution is that it is bulky, unpractical and generally poorly cost-effective, insofar as it requires important investments by the highway company.

U.S. Pat. No. 5,835,203 discloses and claims an inter-vehicle communication system which utilizes a laser beam.

This system has the disadvantage of a difficult fabrication, with a complex and limited data management system.

From U.S. Pat. No. 5,529,138 a laser-based alarm system for motor vehicles is known, wherein a sensor detects the speed of the preceding vehicle and warns or, in another embodiment, automatically brakes the vehicle in danger conditions.

A drawback of this known device is that laser beam data management is complicated, highly elaborate and prone to error.

Other documents, more or less relating to inter-vehicle data communication systems, are US2004093160, U.S. Pat. No. 6,493,123, U.S. Pat. No. 6,014,601, US2003052773, U.S. Pat. No. 3,891,966, FR-A-2694639.

All these documents have the above particular drawbacks, as well as other important limitations.

First, the information is unrelated to external conditions, and remains unchanged regardless of condition variations. For example, in case of traffic congestion or queues, the information is always transmitted from the preceding to the following vehicle, and there is no way to enlarge the transmission range, which might be of vital importance.

SUMMARY OF THE INVENTION

An general object of this invention is to overcome the above drawbacks, by providing a roadway communication system that is practical, cost-effective and most of all efficient.

A particular object is to provide a selective roadway communication system, which is able to exclude from information the vehicles traveling in the drive direction opposite the predetermined information transmission direction.

Another object of the invention is to provide a system that allows selective communication from one vehicle to the next.

Finally, an object of the invention is to provide a method of use of the above system, which assures a reliable and effective data transfer.

These objects, as well as others that will be apparent hereinafter, are fulfilled by an intelligent vehicle communication system according to claim 1, which comprises a communication device designed to be placed on a stationary support or a vehicle traveling on a roadway and a receiver device, designed to be placed on a stationary support or a vehicle traveling on a roadway and interacts with said communication device, wherein said communication device comprises first means for interfacing with external data detection means, emitter means for generating and emitting a laser beam with predetermined solid angle and range, digitizing means for digitizing said laser beam and control means for processing said data and interacting with said digitizing means to appropriately control said laser beam; and wherein said receiver device comprises receiving means for receiving said laser beam and second means for interfacing with external transducer means.

Thanks to this particular arrangement, the inventive system provides a laser beam, with information associated thereto, which selectively interacts with vehicles traveling in a predetermined drive direction, and excludes the vehicles traveling in a different drive direction.

According to another aspect of the invention there is provided a method of use of the intelligent communication system according to claim 12, wherein said method includes the steps of: providing a communication device designed to be placed on a stationary support or a vehicle traveling on a roadway, said communication device comprising first means for interfacing with external data detection means, emitter means for generating and emitting a laser beam with predetermined solid angle and range, digitizing means for digitizing said laser beam and control means for processing said data and interacting with said digitizing means to appropriately control said laser beam; providing a receiver device, designed to be placed on a stationary support or a vehicle traveling on a roadway, said receiver device comprising receiving means for receiving said laser beam and second means for interfacing with external transducer means; emitting said beam, controlling said laser beam to allow it to selectively interact with vehicles traveling in a predetermined drive direction, and to exclude the vehicles traveling in the opposite drive direction.

BRIEF DESCRIPTION OF THE DRAWINGS

Further features and advantages of the invention will be more apparent from the detailed description of a preferred, non-exclusive embodiment of a system according to the invention, which is described as a non-limiting example with the help of the annexed drawings, in which.

DETAILED DESCRIPTION OF A PREFERRED EMBODIMENT

Figure 1:
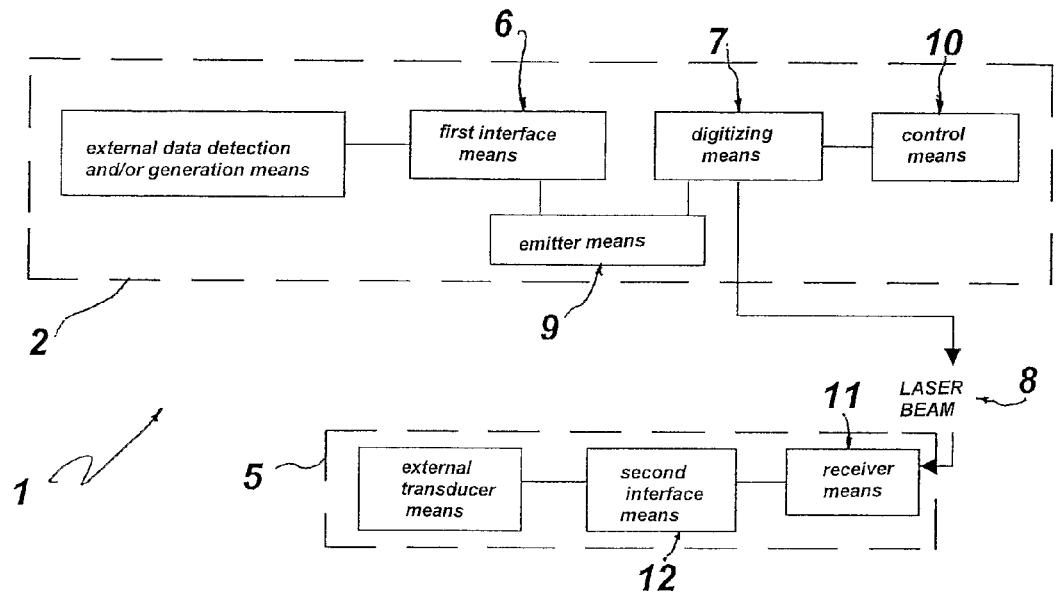
FIG. 1 schematically shows the operation of the system according to the invention.
Figure 2:
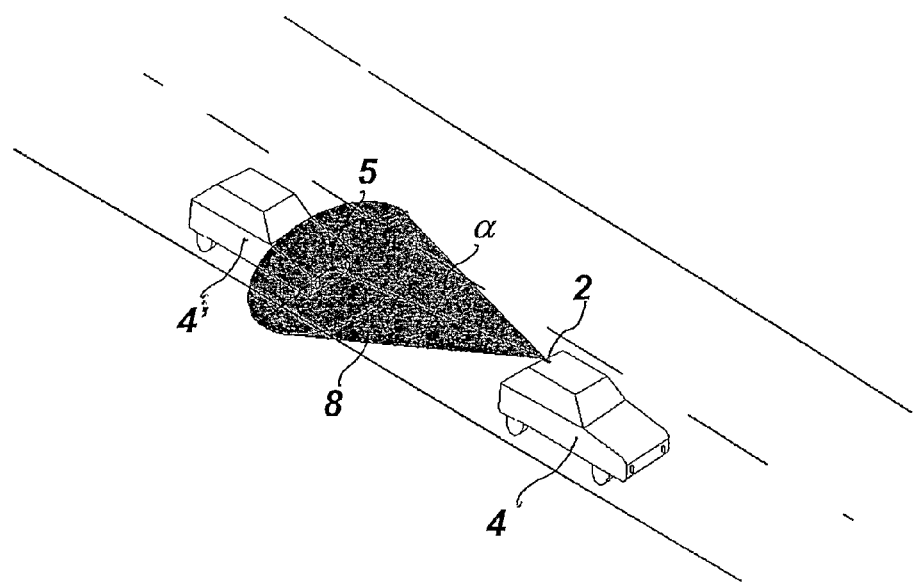
FIGS. 2, 3 and 4 show a preferred configuration of the system according to the invention.
Figure 3:
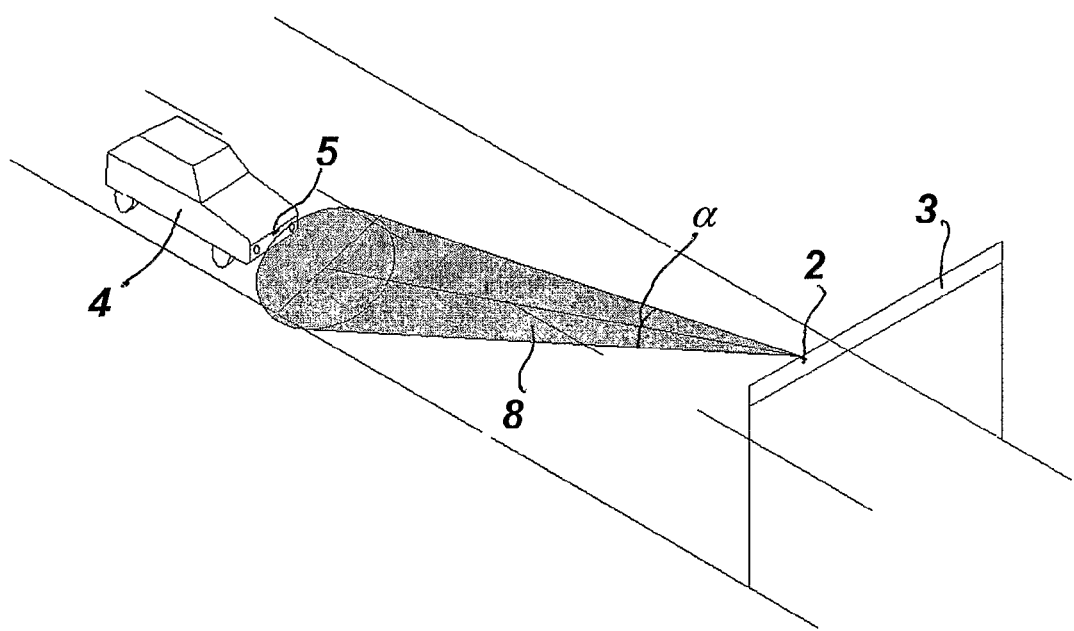
Figure 4:
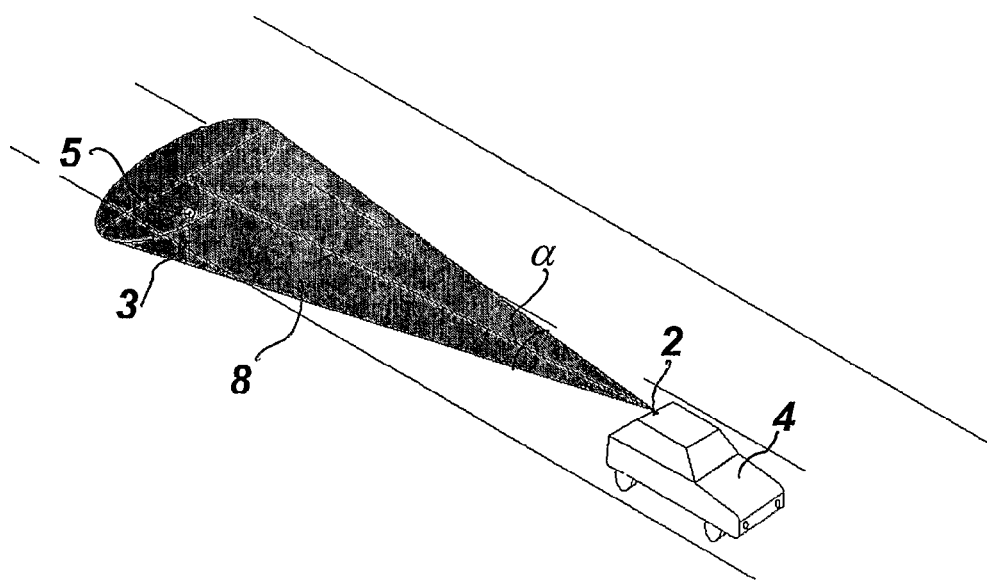
Figure 5:
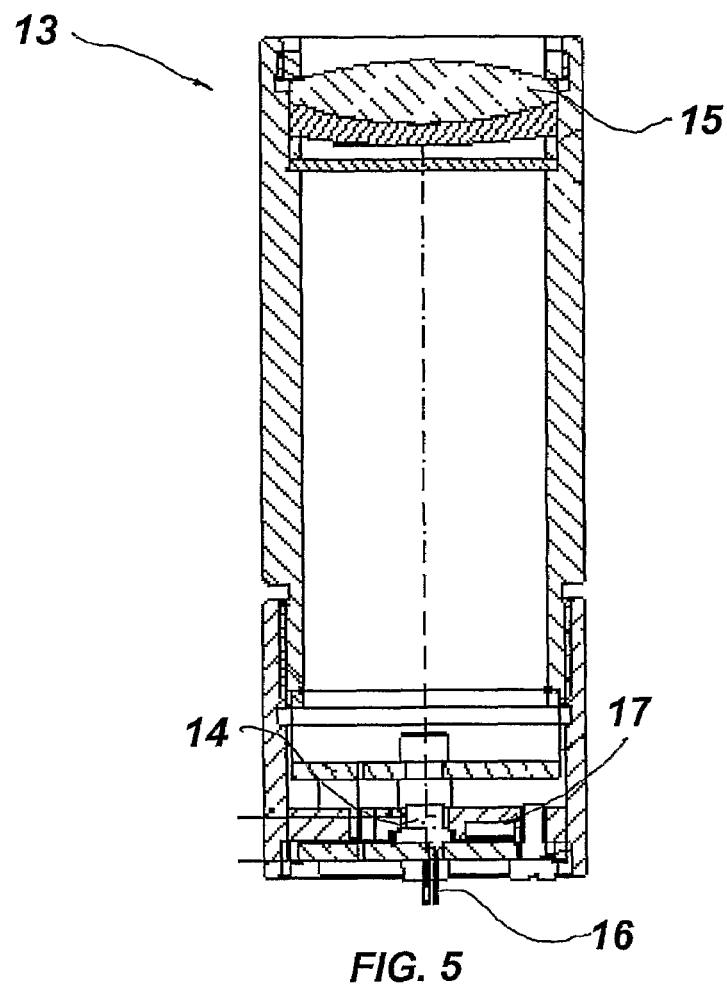
FIG. 5 is a sectional view of a detail of FIG. 2.
Figure 6:
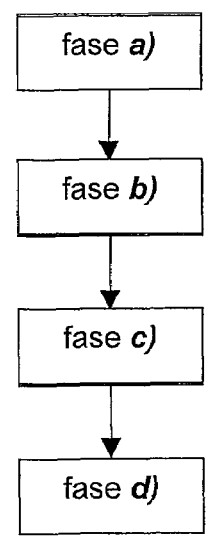
FIG. 6 shows a flowchart of the method of use of the system according to the invention.

Referring to the above figures, the communication system of the invention, generally denoted by numeral 1, is essentially composed of a transmitter device 2, which may be placed on a stationary support 3, e.g. a highway panel, or a vehicle 4 traveling on a roadway, and a receiver device 5, which may be also placed on a vehicle 4' or a stationary support 3.

The communication device 2 transmits data detected by external detection means. Detected data may be of various kinds, e.g. driving parameters of the vehicle 4 whereto the device is mounted, or traffic information. Data input may occur in various manners, e.g. directly from the processing unit mounted to the motor vehicle, from a keyboard, or from a fog detector, in case of a highway panel-mounted transmitter adapted to provide information regarding weather conditions on the road.

For material data acquisition, the device 2 comprises first means 6 for interfacing with said detection means.

Such data, after being suitably digitized by special digitizing means 7, will be transmitted by associating thereto a laser beam 8, which is generated and transmitted by emitter means 9.

For proper data addressing, control means 10 are provided, for suitably conforming and orienting the laser beam 8, to allow it to selectively interact with vehicles traveling in a predetermined drive direction, and to exclude the other vehicles traveling in the opposite drive direction.

This will allow selective communication with vehicles concerned by that particular type of data, and exclusion from such data of unconcerned drivers, who will not receive irrelevant sensory stimuli, which might unnecessarily lower their attention threshold.

The receiver device 5 receives, through special receiving means 11, the laser beam 8 with the data associated thereto, which is transmitted to the concerned person by external transducer means, such as a visual or auditory signal.

To this end, the device 5 has second means 12 for interfacing with the transducer means.

By this arrangement, the system 1 will be able to only transmit data, e.g. relating to a sudden queue or accident, to concerned vehicles, avoiding to transmit useless information to unconcerned drivers.

This is of the utmost importance, especially on urban and extra-urban roads, where an over-abundance of sensory stimuli highly increases the risk of distraction in drivers.

As mentioned above, the device 2, like the device 5, may be mounted on a stationary support 3, such as a highway panel, or on a traveling vehicle 4, so that a vehicle 4 to vehicle 4', vehicle 4 to panel 3, or panel 3 to vehicle 4 communication system may be obtained. As a matter of fact, the type of transmitted information may vary depending on system's configuration.

For example, when the system is configured with both devices 2 and 5 mounted on vehicles 4 and 4', the transmitted information may relate to the driving speed of a vehicle, or the change of a danger-related parameter, such as a pressure loss in a tire.

In this configuration, the device 2 may be suitably mounted to the rear portion of the vehicle 4, for data transmission to the following vehicle 4'.

The receiver device 5 may be advantageously mounted to the front portion.

This adds advantages to the system, which will not only be selective but also have a one-way operation, allowing data transmission from one vehicle 4 to the next 4'.

In one preferred configuration, the emitter means 9 may include a projector 12 having a semiconductor light source 14, preferably of the visible light-emitting laser or LED.

Advantageously, the projector 13 may further include means 15 for modeling the beam 8, preferably selected from the group consisting of lenses, prisms, mirrors, LCD electron mirrors or micromirrors and means 16 for supplying a current having a predetermined intensity.

Advantageously, the device 2 may include modulator means for interaction with the means 15 and 16, to modulate the solid angle $\alpha$ and the range of said laser beam.

Suitable operation of the modulator means allows to adjust the data diffusion area, depending on specific requirements: for example, in case of accidents, all the drivers that reach the accident area have to be warned, so that they can avoid the obstacles on the roadway.

To change the solid angle $\alpha$ of emission, the modulator means may include means for changing the position of the semiconductor source 14 relative to the means 15 for modeling the beam 8.

Furthermore, to change the beam range, the modulator means may include means for adjusting the intensity of the current supplied to the projector 13.

To further increase transmission effectiveness, the emitter device 2 may include optical and/or electronic means 17 for generating images 11 in space or over a substantially flat surface, possibly having a variable configuration. For example, a danger sign, a prohibition sign, or a warning, possibly flashing, may be displayed from time to time. This is particularly useful for transmitting essentially optical information to a following vehicle 4' having no receiver mounted thereon.

This provides the positive advantage of improving effectiveness, especially under bad weather conditions: in addition to communication-derived signaling, a "guiding" feature may be obtained, e.g. to indicate the presence of a stopped or slowly moving vehicle on the roadway. Also, in case of fog, the laser beam 8 will materialize the persistent atmospheric suspension, thereby actually creating a signaling barrier, to protect the vehicle on which it is mounted.

Various parameters may be monitored to detect possible danger situations.

If the transmitter is mounted on a highway panel 3, alarm data may be transmitted thereby, such as a queue warning, or simple routine information, such as average speed information or weather forecast. Thanks to this arrangement, drivers are prepared and informed before reaching a danger site, which is highly advantageous in poor visibility conditions.

Vehicle 4 to highway panel 3 communication provides equally important advantages: for example, in case of accidents or traffic jams, the highway company may be warned in the shortest time, and will have the time to close the concerned road section thereby preventing any dangerous situation.

A method of use of a vehicle communication system includes the following steps. In a first step a), a communication device is provided, which may be placed on a stationary support 3 or a vehicle 4 traveling on a roadway. The communication device may be, for example, as described above.

Then, in step b), a receiver device is provided, which may be placed on a stationary support 3 or a vehicle 4'. The receiver device may be, for example, as described above.

In the following step c) the laser beam is emitted.

Finally, in the last step d), the laser beam is controlled to be suitably modulated, so that it is allowed to selectively interact with vehicles traveling in a predetermined drive direction, and to exclude the other vehicles traveling in the opposite drive direction.

Thanks to the peculiar selectivity of this method of use, the system is particularly effective and safe in defining the recipients of transmitted data.

The above disclosure clearly shows that the inventive system fulfils the proposed objects and particularly the need of a laser beam, with information associated thereto, which selectively interacts with vehicles traveling in a predetermined drive direction, and excludes the vehicles traveling in a different drive direction.

The combination of the means 6, 7, 9 and 10 provides a system that is capable of only transmitting data to the concerned vehicles, while excluding the unconcerned vehicles therefrom.

The system may be further effectively used for vehicles that have no receiver mounted thereon, which case will frequently occur when the application of the system is not widespread, as the device 2 allows to display essentially optical and partial information, provided by the beam 5, which is generated and transmitted by the emitter means 9 and conformed by the control means 10.

The system of this invention is susceptible of a numerous modifications and changes falling within the inventive scope disclosed in the appended claims. All the details thereof may be replaced by other technically equivalent parts, and the materials may vary depending on different needs, without departing from the scope of the invention.

While the system has been described with particular reference to the accompanying figures, the numerals referred to in the disclosure and claims are only used for the sake of a better intelligibility of the invention and shall not be intended to limit the claimed scope in any manner.

The invention claimed is:

1. An interactive vehicle communication system, particularly for motor vehicles, comprising a communication device (2) for being placed on a stationary support (3) or a vehicle (4) traveling on a roadway and a receiver device (5) for being placed on a stationary support (3) or a vehicle (4') traveling on a roadway and interacting with said communication device, wherein said communication device (2) comprises:
    first means (6) for interfacing with external data detection and/or generation means;
    an emitter device (9) with a semiconductor light source (14) for generating and emitting a visible light beam (8) with a predetermined solid angle (α) and range;
    digitizing means (7) for digitizing said visible light beam (8);
    control means (10) for suitably conforming and orienting said visible light beam (8), to allow it to selectively interact with vehicles traveling in a predetermined drive direction, and to exclude other vehicles traveling in the opposite drive direction;
    and wherein said receiver device (5) comprises:
    receiving means (11) for receiving said visible light beam (8);
    interfacing means (12) for interfacing with external transducers;
    characterized in that said semiconductor light source (14) is of the laser type and includes optical and/or electronic means (17) for generating images (11) in space or over a substantially flat surface and having a variable configuration for transmitting optical information to vehicles having no receiver device (5) mounted thereon.

2. A system as claimed in claim 1, wherein said receiver device (5) is placed on a vehicle (4') is mounted to the front portion thereof.

3. A system as claimed in claim 1, wherein said communication device (2) placed on a vehicle (4) is mounted to the rear portion thereof.

4. A system as claimed in claim 1, wherein a projector (13) comprises means (15) for modeling said beam (8) and means (16) for receiving a current having a predetermined intensity.

5. A system as claimed in claim 4, wherein said means (15) for modeling said beam (8) are selected from the group consisting of lenses, prisms, mirrors, LCD electron mirrors, micromirrors.

6. A system as claimed in claim 5, wherein said projector (13) comprises modulator means adapted to interact with said means (15) for modeling said beam and with said means (16) for supplying a current having a predetermined intensity, to modulate the solid angle (α) and the range of said laser beam (8).

7. A system as claimed in claim 6, wherein said modulator means include means for changing the position of said semiconductor source (14) relative to said means (15) for modeling said laser beam (8).

8. A system as claimed in claim 7, wherein said modulator means include means for adjusting the intensity of the current supplied to said projector (13).

9. A method for an intelligent vehicle communication system, particularly for communication among motor vehicles (4, 4') wherein said method includes the steps of:
    a) providing a communication device (2) for being placed on a stationary support (3) or a vehicle (4) traveling on a roadway, said communication device (2) comprising:
        first means (6) for interlacing with external data detection and/or generation means;
        emitter means (9) with a semiconductor light source (14) for generating and emitting a visible light beam (8) with a predetermined solid angle (α) and range;
        digitizing means (7) for digitizing said visible light beam (8);
        control means (10) for processing said data and interacting with said digitizing means (7) to suitably control said visible light beam;
    b) providing a receiver device (5) for being placed on a stationary support (3) or a vehicle (4') traveling on a roadway, said receiver device (5) comprising
        receiving means (11) for receiving said visible light beam (8);
        second means (12) for interfacing with external transducers;
    c) emitting said visible light beam (8);
    d) controlling said visible light beam (8), to allow it to selectively interact with vehicles traveling in a predetermined drive direction, and to exclude other vehicles traveling in the opposite drive direction;
    characterized in that said semiconductor light source (14) is selected to include a visible light-emitting laser and to include optical and/or electronic means (17) for generating images (11) in space or over a substantially flat surface with a variable configuration for transmitting optical information to vehicles having no receiver device (5) mounted thereon.

* * * * *